United States Patent
Kano

(10) Patent No.: US 12,161,139 B2
(45) Date of Patent: Dec. 10, 2024

(54) SOUP STOCK PACK PRODUCTION METHOD AND SOUP STOCK PACK PRODUCTION APPARATUS

(71) Applicant: OKUME INC., Tokyo (JP)

(72) Inventor: Fumitoshi Kano, Tokyo (JP)

(73) Assignee: OKUME INC., Tokyo (JP)

( * ) Notice: Subject to any disclaimer, the term of this patent is extended or adjusted under 35 U.S.C. 154(b) by 0 days.

(21) Appl. No.: 17/906,323

(22) PCT Filed: Jun. 14, 2022

(86) PCT No.: PCT/JP2022/023755
§ 371 (c)(1),
(2) Date: Sep. 14, 2022

(87) PCT Pub. No.: WO2023/281989
PCT Pub. Date: Jan. 12, 2023

(65) Prior Publication Data
US 2023/0126001 A1    Apr. 27, 2023

(30) Foreign Application Priority Data
Jul. 7, 2021   (JP) ................ 2021-112575

(51) Int. Cl.
*A23L 23/00*   (2016.01)
*G06K 19/06*   (2006.01)

(52) U.S. Cl.
CPC ........ *A23L 23/00* (2016.08); *G06K 19/06037* (2013.01)

(58) Field of Classification Search
CPC .................................................. A23L 23/00
See application file for complete search history.

(56) References Cited

U.S. PATENT DOCUMENTS

2002/0004749 A1*   1/2002  Froseth ................ G06Q 50/00
                                                          705/16

FOREIGN PATENT DOCUMENTS

CA        2 643 470 A1     5/2009
CN       102530457 B       6/2014
(Continued)

OTHER PUBLICATIONS

Merritt, Naples Daily News, https://archive.naplesnews.com/lifestyle/neapolitan/old-fashioned-butcher-counter-with-advice-and-expertise-isnt-gone-in-naples-ep-389001285-339588202.html (Year: 2012).*
(Continued)

*Primary Examiner* — Anthony J Weier
(74) *Attorney, Agent, or Firm* — Saliwanchik, Lloyd & Eisenschenk

(57) ABSTRACT

Manufacturers produce various soup stock packs, and try to meet preferences of users who are consumers. However, there is a problem in that users have no opportunity to more voluntarily get involved in making user's preferred soup stock packs. For solving the above problem, a soup stock pack production method including: a selection accepting step of accepting a selection of a predetermined number of foodstuffs from a plurality of foodstuffs each of which is a material of a soup stock; a composition ratio acquiring step of acquiring respective composition ratios of the selected foodstuffs; a grinding step of grinding the selected foodstuffs based on the acquired composition ratios; and a packaging step of making a soup stock pack by packaging the plurality of ground foodstuffs, and the like are provided.

20 Claims, 7 Drawing Sheets

(56) References Cited

FOREIGN PATENT DOCUMENTS

| | | | |
|---|---|---|---|
| CN | 111292467 A | | 6/2020 |
| JP | 2002157472 | * | 5/2002 |
| JP | 2007-330506 A | | 12/2007 |
| JP | 2015-57995 A | | 3/2015 |
| JP | 2017018047 A | | 1/2017 |
| JP | 2019-74838 A | | 5/2019 |
| KR | 10-2020-0023824 A | | 3/2020 |
| TW | M549389 U | | 9/2017 |

OTHER PUBLICATIONS

Taste Makers, https://www.watchtastemakers.com/left-bank-butchery/mobilebutchershop (Year: 2020).*

Tomasi, Homemade Vegetable Stock Powder (https://aseasyasapplepie.com/homemade-vegetable-stock-powder/) (Year: 2015).*

Fookes, Growers turn vegies to powder to reduce waste and meet demand for superfood craze (https://www.abc.net.au/news/rural/2018-07-12/powered-veg-reduces-waste-and-meets-demand-for-superfood-craze/9979182) (Year: 2015).*

Additive-free shop Okume Mie Vison store, "Recruitment of new business members at "Vison", a comprehensive food resort born in Taki, Mie Prefecture" (online), Mar. 8, 2021 (searched Mar. 2, 2022), https://www.facebook.com/Okumeshouten1871.

Taikotei Co., Ltd., "Prepare your own "My Dashi" on the spot, Kansai Odashi specialty store "Dashigura" will officially open on Nov. 11 in Senri-Chuo, Osaka with "Kurabiraki"" (online), Oct. 28, 2015 (searched Mar. 2, 2022), https://www.atpress.ne.jp/news/79115/amp.

Taikotei Co., Ltd. "You can prepare your own original dashi from 63 options "My Odashi" online sales start" (online), Nov. 10, 2016 (searched Mar. 2, 2022), https://www.atpress.ne.jp/news/115942.

PTT post entitled "Problem: This Chinese Herbal Medicine (with Diagrams)," 2 pages, posted Nov. 3, 2016 by user "aquarius523 (minerva)". Retrieved from Internet: <https://www.ptt.cc/bbs/cookclub/M.1478175957.A.9FB.html>.

Food and Drug Administration. "Second Announcement—Provisions Exempting Partial Labeling of Small Packaged Foods—Draft." In Taiwan's Ministry of Health, Labor, and Welfare, May 18, 2021 [online]. [retrieved on Nov. 29, 2023]. Retrieved from the Internet: <https://www.mohw.gov.tw/cp-5016-60786-1.html>.

* cited by examiner

SOUP STOCK PACK PRODUCTION METHOD AND SOUP STOCK PACK PRODUCTION APPARATUS

CROSS-REFERENCE TO RELATED APPLICATIONS

This application is the U.S. national stage application of International Patent Application No. PCT/JP2022/023755, filed on Jun. 14, 2022, which claims the benefit under 35 U.S.C. § 119 of Japanese Application No. 2021-112575, filed on Jul. 7, 2021, the disclosures of each of which are incorporated herein by reference in their entirety.

TECHNICAL FIELD

The present invention relates to a soup stock pack production method and a soup stock pack production apparatus for producing a soup stock pack from a plurality of foodstuffs each of which is a material of a soup stock.

BACKGROUND ART

Formerly, for a soup stock that is the base of the taste of food, a dried fish such as dried bonito or dried mackerel, kelp or the like was decocted. Now, soup stock granules, soup stock liquid and soup stock packs are in widespread use, and the soup stock can be easily taken.

The soup stock pack is obtained by grinding or cutting a foodstuff such as dried bonito or kelp, which is an element of the soup stock, and encapsulating the foodstuff in a water-permeable bag. The soup stock pack is put in water or hot water, and thereby the soup stock can be taken from the encapsulated foodstuff. The soup stock pack has an advantage in that it is possible to appreciate the flavor of the foodstuff (Patent Literature 1).

As the foodstuff that is the element of the soup stock, there are various foodstuffs including dried fishes such as dried bonito and dried mackerel, boiled-dried fishes, dried seaweeds, and dried mushrooms, and by selecting foodstuffs from them and adjusting the composition, it is possible to exhibit various flavors. Users appropriately select and use a wide variety of soup stock packs depending on foods and preferences. For example, soup stock packs in which the chief material is dried bonito are used for soba soups and boiled greens, and soup stock packs in which the chief material is kelp are used for boiled foods and soups in which fishes are used.

CITATION LIST

Patent Literature

Patent Literature 1: Japanese Patent Laid-Open No. 2017-018047

SUMMARY OF INVENTION

Technical Problem

Manufacturers produce various soup stock packs, and try to meet preferences of users who are consumers. However, there is a problem in that users have no opportunity to more voluntarily get involved in making user's preferred soup stock packs.

Solution to Problem

Hence, for solving the above problem, the present invention provides the following soup stock pack production method and the like. That is, the present invention provides a soup stock pack production method including: a selection accepting step of accepting a selection of a predetermined number of foodstuffs from a plurality of foodstuffs each of which is a material of a soup stock; a composition ratio acquiring step of acquiring respective composition ratios of the selected foodstuffs; a grinding step of grinding the selected foodstuffs based on the acquired composition ratios; and a packaging step of making a soup stock pack by packaging the plurality of ground foodstuffs.

The present invention provides the soup stock pack production method further including a presenting step of presenting the plurality of foodstuffs each of which is the material of the soup stock, on a counter, in addition to the above characteristic, in which the selection of the predetermined number of foodstuffs from the plurality of foodstuffs presented on the counter is accepted in the selection accepting step.

Furthermore, the present invention provides the soup stock pack production method, in which at least the grinding step and the packaging step are performed in a booth including the counter, in addition to the above characteristic.

Furthermore, the present invention provides the soup stock pack production method, further including a material displaying step of displaying the selected foodstuffs on a bag that contains one or more soup stock packs packaged in the packaging step, in addition to the above characteristic.

Furthermore, the present invention provides the soup stock pack production method, further including: a selector identification information acquiring step of acquiring selector identification information that is information identifying a person having performed the selection accepted in the selection accepting step; and a selector name writing step of writing a name of a selector identified by the selector identification information related to the soup stock pack, on a bag that contains one or more soup stock packs packaged in the packaging step, in addition to the above characteristic.

Furthermore, the present invention provides the soup stock pack production method, further including a selector soup stock pack information storing step of associating and storing the selector identification information acquired in the selector identification information acquiring step and information relevant to the soup stock pack related to the selection by the selector identified by the selector identification information, in addition to the above characteristic.

Furthermore, the present invention provides the soup stock pack production method, further including: a two-dimensional code generating step of generating a two-dimensional code including information about the selected foodstuffs and the acquired composition ratios; and a two-dimensional code attaching step of attaching the two-dimensional code generated in the two-dimensional code generating step, to the bag, in addition to the above characteristic.

Furthermore, the present invention provides the soup stock pack production method, in which a two-dimensional code including the information about the selected foodstuffs and the acquired composition ratios and information about a person having performed the selection is generated in the two-dimensional code generating step, in addition to the above characteristic.

The present invention provides a soup stock pack production apparatus including: a selection accepting unit that accepts a selection of a predetermined number of foodstuffs from a plurality of foodstuffs each of which is a material of a soup stock; a composition ratio acquiring unit that acquires respective composition ratios of the selected foodstuffs; a grinding unit that grinds the selected foodstuffs based on the acquired composition ratios; and a packaging unit that makes a soup stock pack by packaging the plurality of ground foodstuffs.

The present invention provides the soup stock pack production apparatus further including a counter on which the plurality of foodstuffs each of which is the material of the soup stock is presented, in addition to the above characteristic, in which the selection accepting unit accepts the selection of the predetermined number of foodstuffs from the plurality of foodstuffs presented on the counter.

Furthermore, the present invention provides the soup stock pack production apparatus, in which either or all of the grinding unit and the packaging unit are disposed in a booth including the counter, in addition to the above characteristic.

Furthermore, the present invention provides the soup stock pack production apparatus, further including a material displaying unit that displays the selected foodstuffs on a bag that contains one or more soup stock packs packaged by the packaging unit, in addition to the above characteristic.

Furthermore, the present invention provides the soup stock pack production apparatus, further including: a selector identification information acquiring unit that acquires selector identification information that is information identifying a person having performed the selection accepted by the selection accepting unit; and a selector name writing unit that writes a name of a selector identified by the selector identification information related to the soup stock pack, on a bag that contains one or more soup stock packs packaged by the packaging unit, in addition to the above characteristic.

Furthermore, the present invention provides the soup stock pack production apparatus, further including a selector soup stock pack information storing unit that associates and stores the selector identification information acquired by the selector identification information acquiring unit and selector soup stock pack information that is information relevant to the soup stock pack related to the selection by the selector identified by the selector identification information, in addition to the above characteristic.

Furthermore, the present invention provides the soup stock pack production apparatus, further including: a two-dimensional code generating unit that generates a two-dimensional code including information about the selected foodstuffs and the acquired composition ratios; and a two-dimensional code attaching unit that attaches the two-dimensional code generated by the two-dimensional code generating unit, to the bag, in addition to the above characteristic.

Furthermore, the present invention provides the soup stock pack production apparatus, in which the two-dimensional code generating unit generates a two-dimensional code including the information about the selected foodstuffs and the acquired composition ratios and information about a person having performed the selection, in addition to the above characteristic.

Furthermore, the present invention provides the soup stock pack production apparatus, in which the two-dimensional code generated by the two-dimensional code generating unit includes information for accessing the stored selector soup stock pack information, in addition to the above characteristic.

Furthermore, the present invention provides the soup stock pack production apparatus, in which the two-dimensional code generated by the two-dimensional code generating unit includes information for accessing a member registration page, in addition to the above characteristic.

Furthermore, the present invention provides the soup stock pack production apparatus, in which the two-dimensional code generated in the two-dimensional code generating step includes information for accessing the stored selector soup stock pack information, in addition to the above characteristic.

Furthermore, the present invention provides the soup stock pack production apparatus, in which the two-dimensional code generated in the two-dimensional code generating step includes information for accessing a member registration page, in addition to the above characteristic.

Advantageous Effect of Invention

By the present invention, it is possible to provide a soup stock pack production method and a soup stock pack production apparatus that make it possible to produce a soup stock pack in which foodstuffs selected by a user are used.

DESCRIPTION OF EMBODIMENTS

Embodiments of the present invention will be described below with use of the accompanying drawings. The present invention is not limited to the embodiments at all, and can be carried out as various modes without departing from the spirit.

The mutual relation between the embodiments and the claims is shown as follows. An embodiment 1 is mainly relevant to claims 1 to 3 and claims 11 to 13, an embodiment 2 is mainly relevant to claims 4 to 6 and claims 14 to 16, and an embodiment 3 is mainly relevant to claims 7 to 10 and claims 17 to 20.

Embodiment 1

<Overview>

Figure 1:
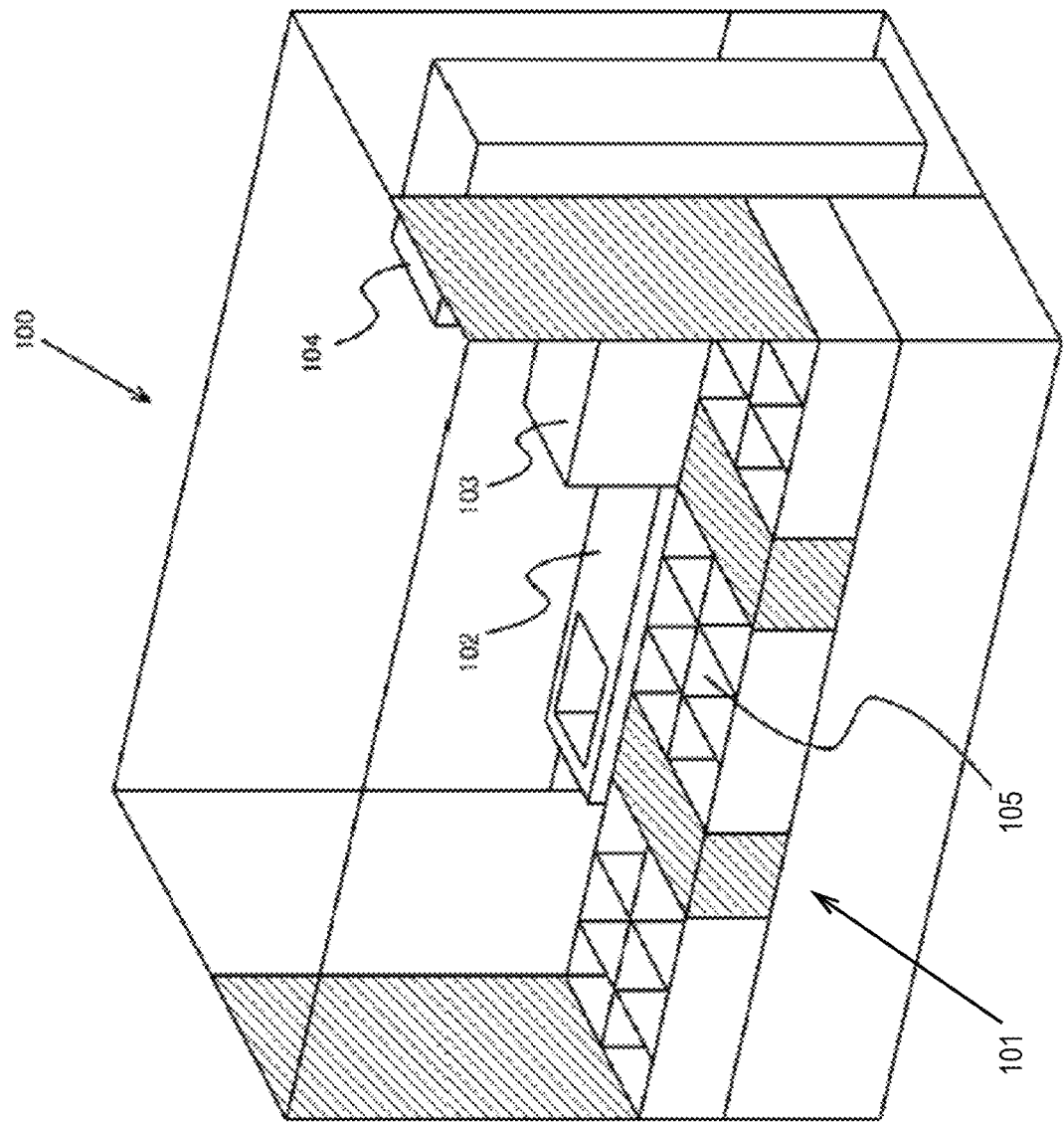
FIG. 1 is a conceptual diagram showing an example of a booth for producing a soup stock pack.

FIG. 1 is a conceptual diagram showing an example of a booth for producing a soup stock pack. A booth 100 includes a counter 101 for presenting a plurality of kinds of soup stock materials, a workbench 102, a grinding machine 103 and a packaging machine 104, and the counter 101 is provided with a plurality of containers 105 that contains the soup stock materials.

For example, a user such as a purchaser or a consumer selects a plurality of preferred materials from dried bonito, kelp and others that are the presented soup stock materials contained in the containers of the counter 101 respectively, and transmits the selected foodstuffs to a manufacturer in the booth orally or through a paper sheet, a tablet terminal or the like. The manufacturer having received this appropriately blends the selected foodstuffs, grinds them with the grinding machine 103, and further packages them with the packaging machine 104 so as to divide them into small groups, so that soup stock packs are obtained. By this configuration, the user can purchase the soup stock pack of the foodstuffs selected by the user for oneself.

The function and the processing flow of the soup stock pack production apparatus and the content of hardware will be described below. Functional blocks of the apparatus described below can be realized as combinations of hardware and software. Specifically, in the case of using a computer, there are a hardware configuration unit such as a central processing unit (CPU), a main memory, a bus, or a secondary storage device (a non-volatile memory such as a hard disk drive and a flash memory, storage media such as a CD and a DVD, and a reading drive for the media, and the like), an input device that is used for information input, a printing system, a display device or another external peripheral device, an interface for the external peripheral device, a communication interface, a driver program for controlling the hardware, another application program, a user interface application, and others. By the arithmetic processing of the CPU in accordance with a program expanded on the main memory, data or the like input from the input device, another interface or the like and held on the memory or hard disk is processed or stored, or a command for controlling the above hardware or software is generated. Alternatively, the functional blocks of the apparatus may be realized by dedicated hardware.

Further, in this invention, a part of the configuration may be realized by a server device that is connected through a network. Further, this invention can be realized not only as an apparatus but also as a method. Further, a part of this invention can be configured as software. Furthermore, a program that is used for causing a computer to execute such software, and a recording medium in which the program is fixed are naturally included in the technical scope of this invention (the same applies to the whole of the present specification).

<Functional Configuration>

Figure 2:
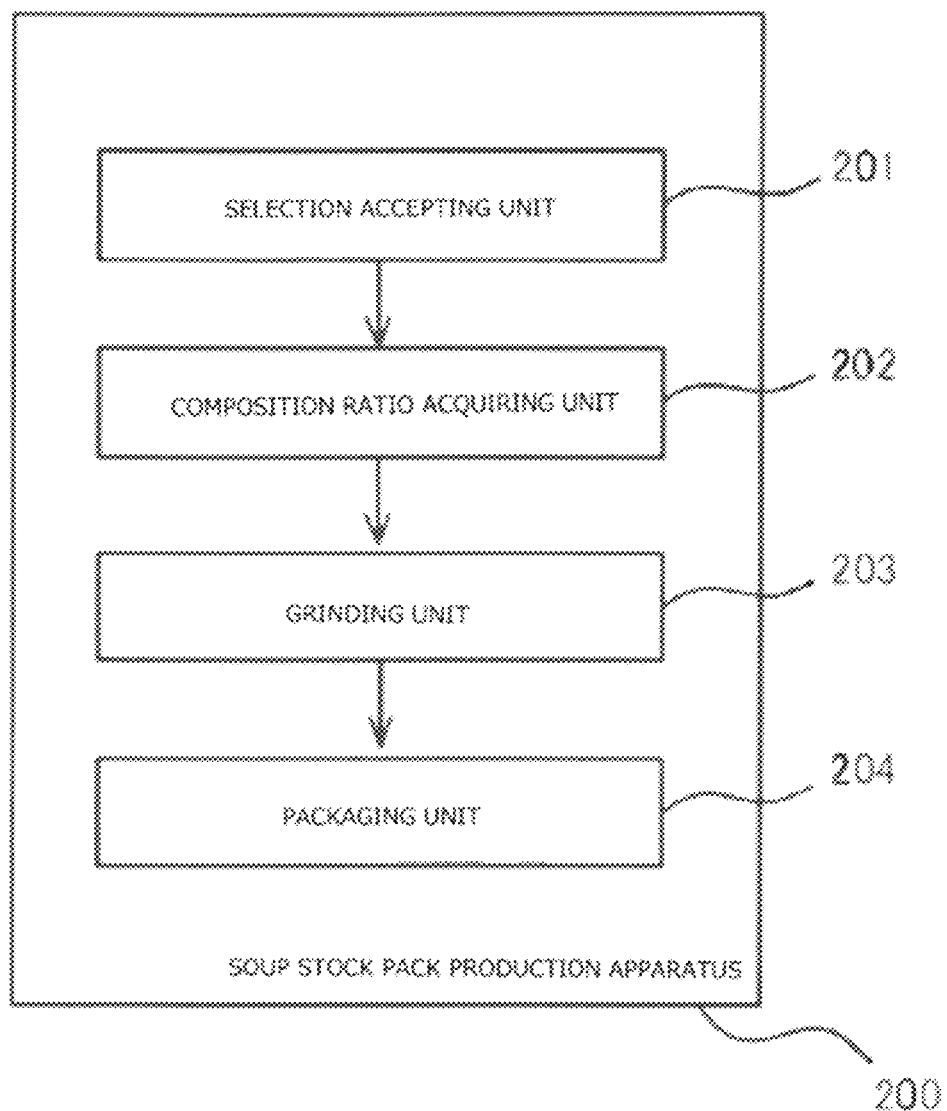
FIG. 2 is a block diagram showing an example of the functional configuration of a soup stock pack production apparatus in an embodiment.

FIG. 2 is a block diagram showing an example of the functional configuration of the soup stock pack production apparatus in the embodiment. As shown in FIG. 2, a soup stock pack production apparatus 200 includes a selection accepting unit 201, a composition ratio acquiring unit 202, a grinding unit 203 and a packaging unit 204.

The selection accepting unit 201 has a function to accept a selection of a predetermined number of foodstuffs from a plurality of foodstuffs each of which is a material of a soup stock. As the material of the soup stock, materials that are foodstuffs and that are used as the material of the soup stock can be used, and the kind is not particularly limited. For example, there are high-grade dried bonito, common dried bonito, dried frigate bonito, dried mackerel, dried tuna, dried decapterus, dried sardine, dried saury, dried salmon, dried round herring, top-quality dried bonito, high-grade dried frigate bonito, high-grade kamebushi, high-grade mackerel, naked dried frigate bonito, common dried bonito, common kamebushi, common dried tuna, boiled-dried bream, boiled-dried barracuda, boiled-dried round herring, boiled-dried pilchard, boiled-dried flying fish, boiled-dried lizardfish, boiled-dried anchovy, boiled-dried setouchi, boiled-dried horse mackerel, boiled-dried blue sprat, boiled-dried rockfish, baked flying fish, naked decapterus, Hidaka kelp, Risiri kelp, giant kelp, Raus kelp, cat foot root kelp, long head kelp, giant kelp ear, Raus kelp ear, Risiri kelp ear, shiitake mushroom, damaged shiitake mushroom, shiitake mushroom axis, donko, kosin, dried cuttlefish, shelled shrimp, dried chicken, and the like. Furthermore, shellfishes such as scallops, boiled-dried asari clam and shijimi clam, and vegetables such as onion, garlic and carrot can be also used as the material of the soup stock. Many foodstuffs are used as the material of the soup stock, so that 20 or more kinds can be exemplified. The counter shown in FIG. 1 includes three containers each of which has 6 retaining rooms in one group, but by providing 8 retaining rooms in one group, it is possible to contain 24 kinds of soup stock materials. Further, a counter having a larger number of retaining rooms may be included.

There are various ways for the selection of foodstuffs that are materials of the soup stock, and for example, in the embodiment, the user can perform the selection while directly seeing the plurality of foodstuffs that are materials of the soup stock and that are presented on the counter and smelling the aroma. There is a special effect by which the user can easily imagine a soup stock that the user wants to savor, by seeing various materials of the soup stock up close. The selection by the user may be accepted on the spot by a person who provides the soup stock, or may be accepted when the user fills in an order form prepared on the counter or the like or inputs the selection to a tablet. Further, the user may access a website operated by the person who provides the soup stock pack, and may perform the selection at the website.

Further, instead of actually seeing foodstuffs, the user may access an EC site operated by the person who provides the soup stock pack, and may select foodstuffs at the EC site. Alternatively, the user may select and order foodstuffs by telephone, FAX, e-mail or the like, using an order sheet or the like sent to the user. Further, for a user who has already purchased the soup stock pack, the materials of the soup stock may be selected based on a purchase history, from a customer card that is given at the time of the purchase and on which the ID (identification information, which may be selector identification information described later) of the user, the name, the content of the purchased soup stock pack, and the like are written.

Further, the predetermined number of the foodstuffs that are selected varies depending on the way of the selection. For example, "five kinds" of foodstuffs may be selected by the user, or two kinds or three kinds of main foodstuffs may be selected by the user and other foodstuffs may be additionally selected. Further, it is preferable to guide the user who performs the selection about how to perform the selection. For example, by showing the flavor of a foodstuff that is a selection object and showing a food matching a soup stock in which the foodstuff is used, the user is assisted in selecting the foodstuff that is suitable for the food and that the user wants to use. Such a guidance may be performed to the user by a staff or the like in the booth face-to-face, may be displayed on a terminal such as a tablet prepared on the counter, or may be shown on a paper sheet.

The composition ratio acquiring unit 202 has a function to acquire the respective composition ratios of the selected foodstuffs. For example, in the case where "dried bonito", "kelp", "boiled-dried flying fish" and "shiitake mushroom axis" are selected as foodstuffs, the composition ratios of the respective foodstuffs are acquired. The acquisition of the composition ratio may be configured such that the weight of each foodstuff is acquired instead of merely acquiring the ratio. The composition ratio may be acquired by the selection by the user, or may be acquired by the selection by a person related to the production of the soup stock pack. Further, it is allowable to adopt a configuration in which a composition ratio corresponding to the selected foodstuff is previously prescribed and the composition ratio is automatically acquired based on the selection of the foodstuff. Further, it is allowable to adopt a configuration in which the quantity of the soup stock pack to be produced is acquired together with the composition ratio. For example, "300 grams" may be acquired as the quantity for the production, or "20 packs" or the like may be acquired in a unit of the number of packs.

The grinding unit 203 has a function to grind the selected foodstuffs based on the acquired composition ratios. In the embodiment, the function is fulfilled by the grinding machine 103 that is provided in the booth. Although the specification or the like of the grinding machine is not limited, a grinding machine is preferable that can grind the foodstuffs to about several millimeters to several hundreds of micrometers finally, for producing the soup stock pack. Further, for the use in a limited space such as the booth, a grinding machine is preferable that can perform cracking and grinding integrally. Further, many foodstuffs that are materials of the soup stock are high in fiber, and therefore it is preferable to use a cutter mill.

Further, from the standpoint of the homogenization of the completed soup stock pack after dividing into small groups and packaging as the soup stock pack, it is preferable to grind together the foodstuffs arranged to the quantities in accordance with the acquired composition ratios. However, the respective selected foodstuffs may be ground, and then the foodstuffs may be blended at the acquired composition ratios and thereafter may be packaged. In the case of performing the grinding earlier, it is preferable to homogenize the foodstuffs, for example, by stirring the foodstuffs, before the packaging for the soup stop pack.

The packaging unit 204 has a function to make a soup stock pack by packaging the plurality of ground foodstuffs. It is preferable that the interval from the grinding to the packaging be as short as possible. This is because the flavor can be degraded when the ground foodstuffs are exposed to air. It is preferable to provide the packaging unit in the booth along with the grinding unit, because the process can be performed while the interval from the grinding to the packaging is short. Other than the case where the packaging is performed in the booth, it is preferable to make the soup stick pack by performing the packaging while the ground foodstuffs are not exposed to much air.

In the embodiment shown in FIG. 1, the function of the packaging unit 204 is fulfilled by the packaging machine 104. Specifically, the function of the packaging unit 204 is fulfilled by a machine called a packaging machine or a filling machine. In the embodiment, a plurality of soup stock packs divided into small groups, for example, 20 packs are produced, and therefore, a filling machine is preferable that uses a water-permeable wrapping body allowing the soup stock to be easily extracted, as exemplified by unwoven cloth, and that can serially perform the filling and sealing of a predetermined amount of foodstuffs for the soup stock pack. The way of the packaging, which includes various ways such as three-side sealing, four-side sealing, tetra packaging and pillow packaging, can be appropriately selected and used.

By providing the grinding machine and the packaging machine in the booth including the counter, the user can select foodstuffs for oneself from the foodstuffs presented on the counter, can be in a situation where the soup stock pack in which the selected foodstuffs are used is produced, and can purchase the soup stock pack immediately after the production. Further, by making the booth suitable for the production of the soup stock pack, it is possible to easily perform the production and sale of the soup stock pack in a commercial facility or a sightseeing facility.

<Hardware Configuration>

Figure 3:
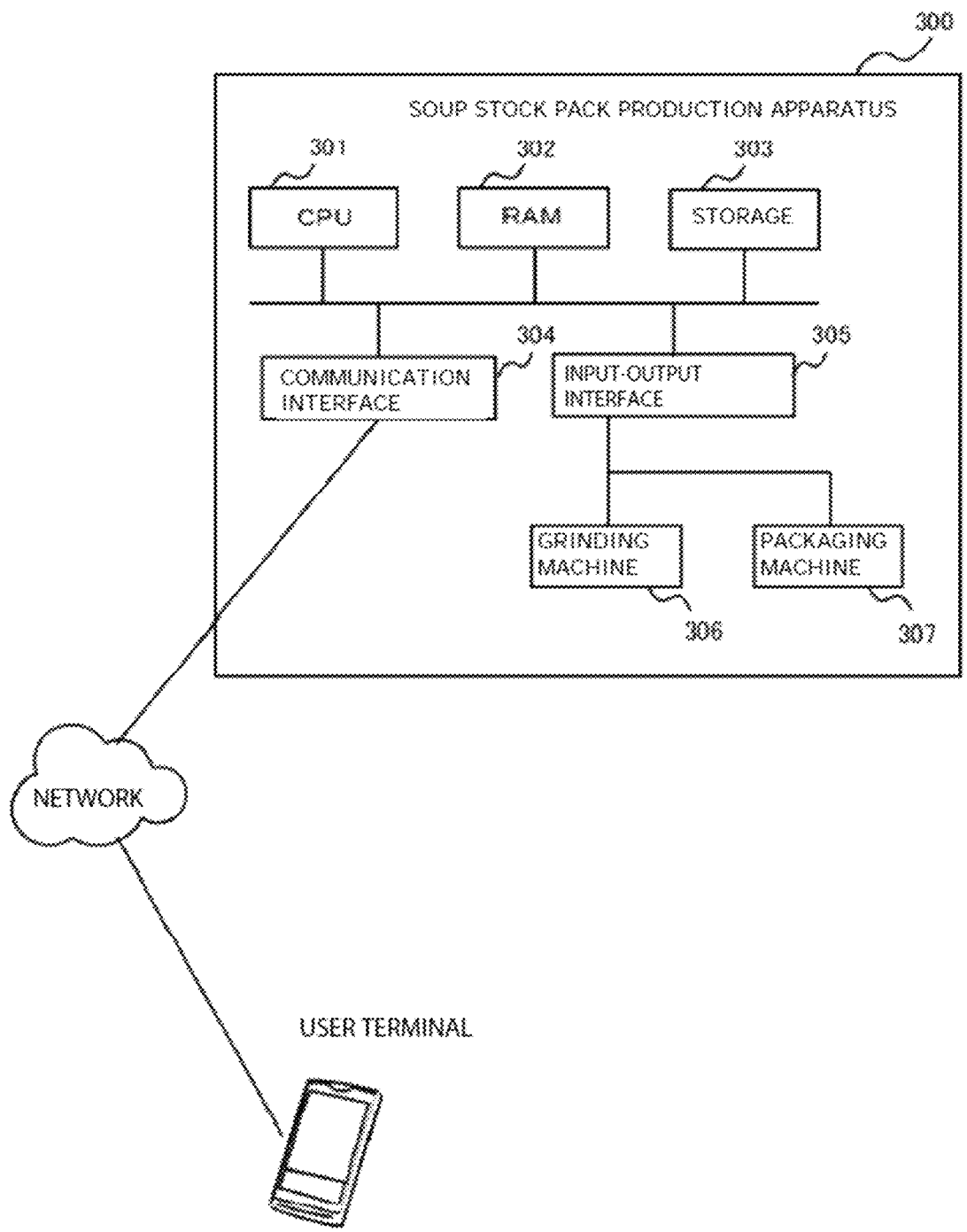
FIG. 3 is a conceptual diagram showing a configuration example of hardware that realizes the soup stock pack production apparatus.

FIG. 3 is a conceptual diagram showing a configuration example of hardware that realizes the soup stock pack apparatus. As shown in the figure, a soup stock pack production apparatus 300 includes a CPU 301 that performs various arithmetic processes, a RAM 302 that is a volatile recording medium, a storage 303 that is a non-volatile storing medium such as a flash memory and an HDD, a communication interface 304, and an input-output interface 505, and is connected with devices such as a display and a touch panel, a grinding machine 306 and a packaging machine 307, through the input-output interface 505. The RAM 302 reads programs that perform various arithmetic processes, for causing the CPU 301 to execute the programs, and provides a work area (working area) for the programs. Further, a plurality of addresses is assigned to the RAM 302, and the program to be executed by the CPU 301 specifies and accesses the address, and thereby can mutually exchange data and perform the process (the same applies to the whole of the present specification).

The function of the selection accepting unit 201 of the soup stock pack production apparatus 200 in FIG. 2 can be realized by the input-output interface 305 that is connected with the touch panel for accepting the selection by the user, the CPU 301 that accepts the user's selection of foodstuffs that are materials of soup stock by accepting the input and appropriately executing the program, and the RAM 302, and the accepted selection of the foodstuffs can be stored in the storage 303. Further, the selection of the foodstuffs by the user can be accepted through the communication interface 304, from a user terminal connected by a network. Further, the function of the composition ratio acquiring unit 202 can be configured such that the respective composition ratios of the selected foodstuffs are acquired from the touch panel or the like connected with the input-output interface 305, or are acquired from an external server, a database or the like in the exterior through the communication interface 304, or the composition ratios corresponding to the selected foodstuffs are acquired when the RAM 302 reads the program held in the storage 303 and the CPU 01 executes the program. Further, the function of the grinding unit 203 is realized by the grinding machine 306 alone, or is realized by the grinding machine 306 together with the CPU 301 and the RAM 302 through the input-output interface 305. Further, the function of the packaging unit 204 is realized by the packaging machine 307 alone, or is realized by the packaging machine 307 together with the CPU 301 and the RAM 302 through the input-output interface 305. A part or whole of the hardware configuration for realizing the functions of the units may be a hardware configuration that is included in an unillustrated server device connected through the network. For example, the hardware configuration for realizing the functions of the selection accepting unit 201 and the composition ratio acquiring unit 202 may be a hardware configuration that is included in the server device (the same applies to embodiments described below).

<Processing Flow>

Figure 4:
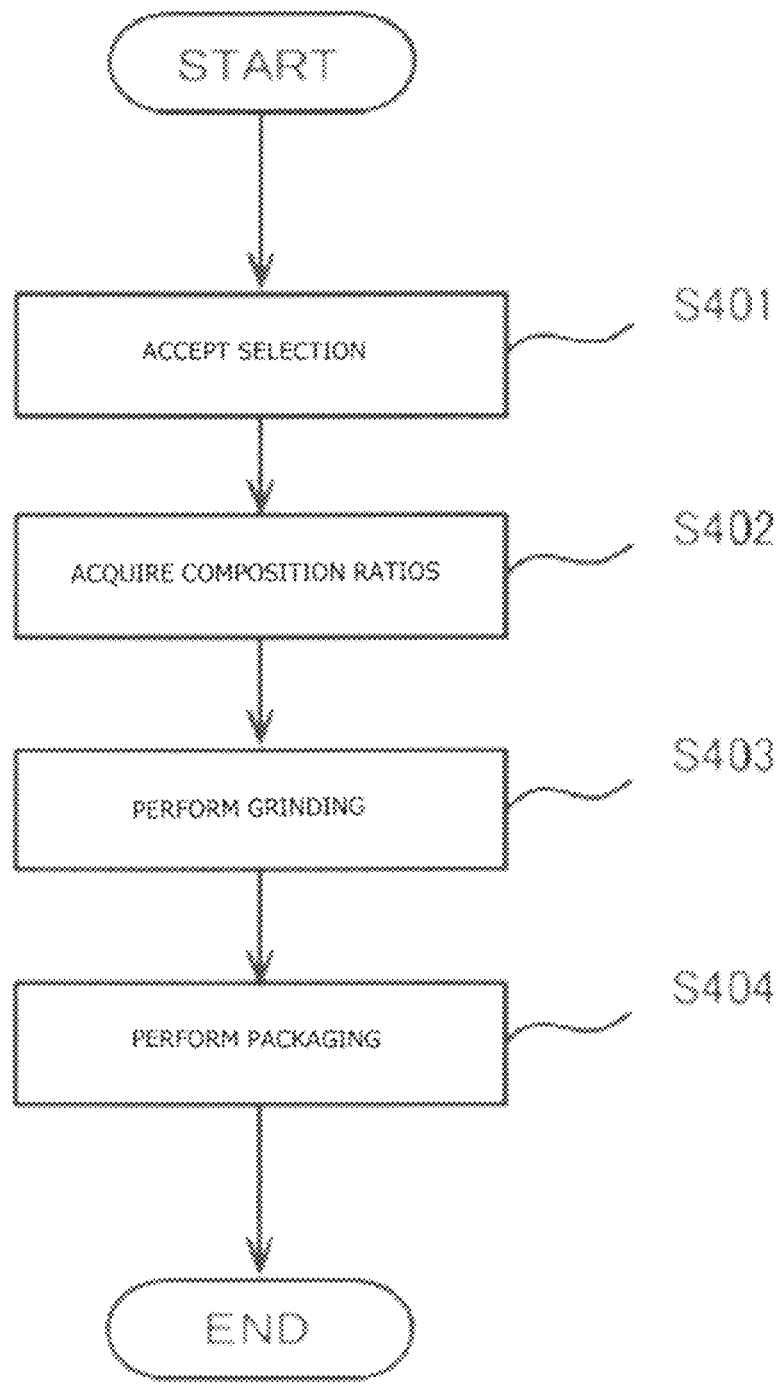
FIG. 4 is a flowchart showing an example of the processing flow of a soup stock pack production method in an embodiment 1.

FIG. 4 is a flowchart showing an example of the processing flow of a soup stock pack production method in the embodiment. As shown in FIG. 4, the selection of a predetermined number of foodstuffs is accepted from a plurality of foodstuffs each of which is a material of the soup stock (selection accepting step: S401). Then, the respective composition ratios of the selected foodstuffs are acquired (composition ratio acquiring step: S402). Then, the selected foodstuffs are ground based on the acquired composition ratios (grinding step: S403). Then, the soup stock pack is made by packaging the plurality of ground foodstuffs (packaging step: S404).

Further, in the case where the soup stock pack is produced in the booth including the above-described counter, a presenting step of presenting the plurality of foodstuffs each of which is the material of the soup stock on the counter is included before the above selection accepting step S401, and the selection of the predetermined number of foodstuffs from the plurality of foodstuffs presented on the counter can be accepted in the selection accepting step S401.

<Effect>

According to the embodiment, it is possible to provide a soup stock pack production apparatus and a soup stock pack production method that make it possible to produce a soup stock pack in which foodstuffs selected by a user are used.

Embodiment 2

<Overview>

The embodiment is based on the soup stock pack production apparatus and soup stock pack production method in the embodiment 1, and relates to a soup stock pack production apparatus and a soup stock pack production method for displaying the foodstuffs as materials and a person having performed the selection of the foodstuffs on the product.

<Functional Configuration>

The soup stock pack production apparatus in the embodiment further includes a material displaying unit, a selector identification information acquiring unit and a selector name writing unit, in addition to the constituents of the soup stock pack production apparatus in the embodiment 1. A selector soup stock pack information storing unit may be further included.

The material displaying unit has a function to display the selected foodstuffs on a bag that contains one or more soup stock packs packaged by the packaging unit. In most cases, the soup stock pack packaged by a water-permeable wrapping body is further contained in a bag allowing a tighter closing, from the standpoint of food safety and deterioration prevention. The foodstuffs used in the soup stock pack contained in such a bag are displayed. Even one or more soup stock packs contained in the bag is sometimes referred to as the soup stock pack (hereinafter, the same applies to the present specification).

The selector identification information acquiring unit has a function to acquire selector identification information that is information identifying a person (selector) having performed the selection accepted by the selection accepting unit. The selector identification information may be acquired, for example, when the selection of the foodstuffs that are materials of the soup stock is accepted, or may be acquired in advance. Further, it is allowable to adopt a configuration in which attribute information about the selector identified by the selector identification information, as exemplified by name, sex, age, address, family makeup and occupation, is acquired in association with the selector identification information. Further, it is preferable to adopt a configuration in which the acquired selector identification information and the attribute information acquired in association with the selector identification information are stored.

The selector name writing unit has a function to write the name of the selector identified by the selector identification information related to the soup stock pack, on the bag that contains the one or more soup stock packs packaged by the packaging unit. This bag is the same as the bag described for the material displaying unit, and it is also allowable to adopt a configuration in which the name of the selector is written on the bag on which the foodstuffs as materials are displayed.

Figure 5:
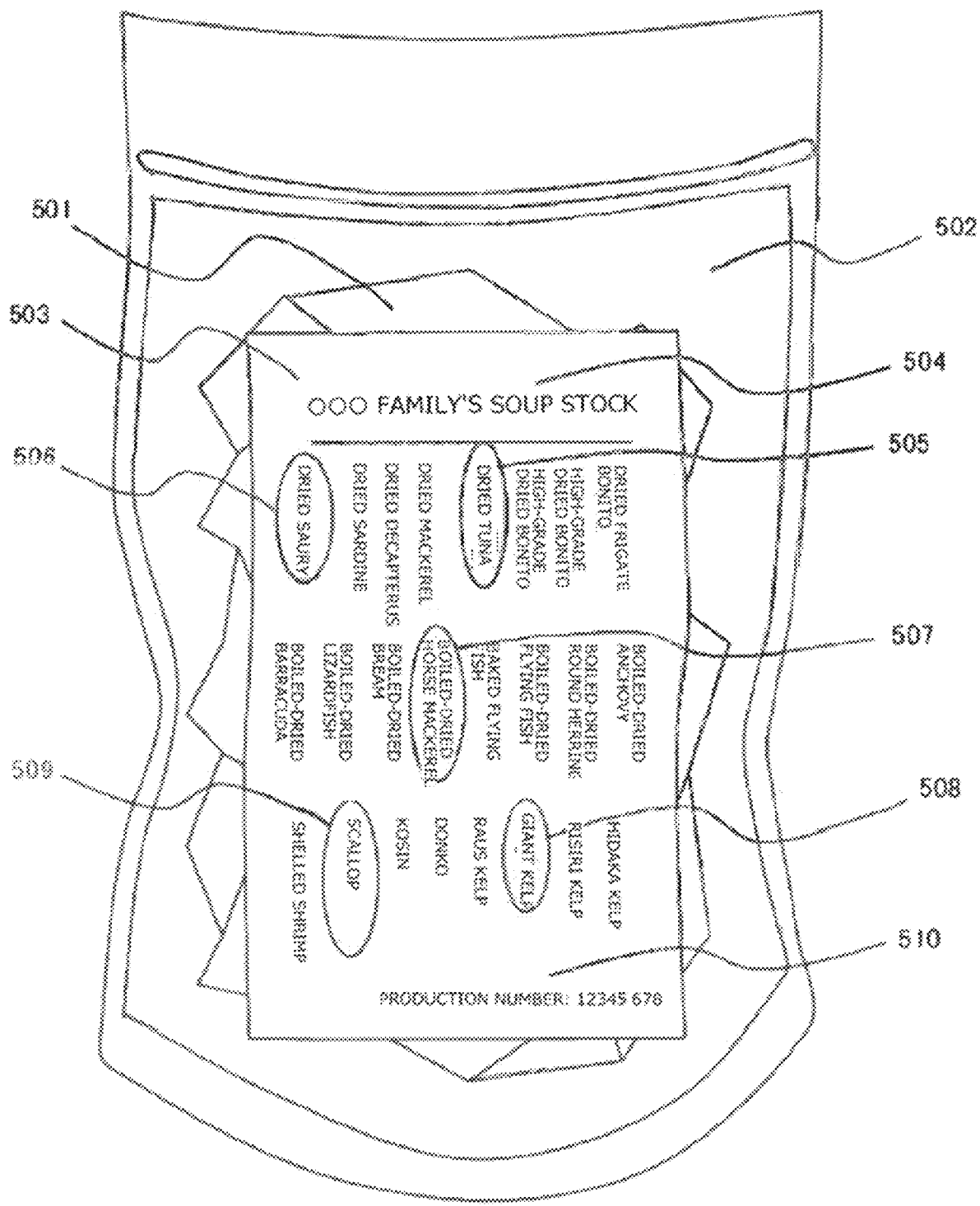
FIG. 5 is a conceptual diagram showing an example in which foodstuffs as materials of the soup stock and the name of a selector are written on a bag that contains the soup stock pack.

FIG. 5 is a conceptual diagram showing an example in which the foodstuffs as materials of the soup stock and the name of the selector related to the soup stock pack are written on the above-described bag. As shown in FIG. 5, a label 503 is pasted on a bag 502 that contains a plurality of soup stock packs 501. On the label 503, the name ◯◯◯ of the selector related to the soup stock pack is written in a manner of "◯◯◯ FAMILY'S SOUP STOCK" 504.

Further, on this label 503, common dried bonito, high-grade dried bonito, dried frigate bonito, dried tuna, dried mackerel, dried decapterus, dried sardine, dried saury, boiled-dried anchovy, boiled-dried round herring, boiled-dried flying fish, baked flying fish, boiled-dried horse mackerel, boiled-dried bream, boiled-dried lizardfish, boiled-dried barracuda, Hidaka kelp, Risiri kelp, giant kelp, Raus kelp, donko, kosin, scallop, and shelled shrimp are listed as foodstuffs that can be selected as the material of the soup stock pack. Each display of the dried tuna 505, the dried saury 506, the boiled-dried horse mackerel 507, the giant kelp 508 and the scallop 509 that are selected from them as the material of the soup stock pack is surrounded by ◯, and is displayed as the material of the soup stock pack.

Only the actually selected foodstuffs may be displayed, instead of displaying all foodstuffs that can be selected as the material of the soup stock pack as shown in FIG. 5. However, it is preferable to display all foodstuffs, for enjoying imaging other combinations of foodstuffs.

Further, it is allowable to adopt a configuration in which the acquired selector identification information and the information relevant to the soup stock pack related to the selection by the selector identified by the selector identification information are associated and stored (selector soup stock pack information storing unit). The information relevant to the soup stock pack is, for example, information including the selected foodstuffs, the composition ratios, the quantity of the soup stock pack, the place and date when the selection is performed, and the date when the soup stock pack is produced. The selector identification information can be stored in association with the attribute information about the selector as described above, and therefore can be further stored in association with the information relevant to the soup stock pack together. Further, a production number 510 associated with the selector identification information, the information relevant to the soup stock pack and the like can be attached. By attaching the contact address of the manufacturer or the like together with the production number, the user can make an inquiry to the manufacturer or the like, and can perform the confirmation of the material, the order of the soup stock pack having the same composition, and the like, based on the production number.

<Hardware Configuration>

The soup stock pack production apparatus in the embodiment can be realized by the hardware configuration shown in FIG. 3, similarly to the embodiment 1. The functions of the material displaying unit and the selector name writing unit of the soup stock pack production apparatus in the embodiment can be realized mainly by the CPU 301 and RAM 302 shown in FIG. 3 and a printer through the input-output interface 305. Further, the function of the selector identification information acquiring unit in the embodiment can be realized mainly by the CPU 301 and RAM 302 shown in FIG. 3 and an input device, such as a touch panel, through the input-output interface 305. Further, the function of the selector soup stock pack information storing unit in the embodiment can be realized mainly by the CPU 301 and RAM 302 shown in FIG. 3 and the storage 303 or a server device or database connected through the communication interface 304.

<Processing Flow>

The processing flow of the soup stock pack production method in the embodiment is basically the same as the processing flow of the soup stock pack production method in the embodiment 1. The soup stock pack production method in the embodiment further includes a material displaying step of displaying the selected foodstuffs on the bag that contains the one or more soup stock packs packaged in the packaging step, a selector identification information acquiring step of acquiring the selector identification information that is the information identifying the person having performed the selection accepted in the selection accepting step, and a selector name writing step of writing the name of the selector identified by the selector identification information related to the soup stock pack on the bag that contains the one or more soup stock packs packaged in the packaging step.

<Effect>

According to the embodiment, it is possible to produce the soup stock pack on which the foodstuffs selected as the material of the soup stock pack and the name of the person having performed the selection are written.

Embodiment 3

<Overview>

The embodiment is based on the soup stock pack production apparatus and soup stock pack production method in the embodiment 1 or the embodiment 2, and relates to a soup stock pack production apparatus and a soup stock pack production method characterized by converting information about the foodstuffs selected as the material of the soup stock pack, the composition ratios and the like into a two-dimensional code and attaching the two-dimensional code to the produced soup stock pack.

<Functional Configuration>

The soup stock pack production apparatus in the embodiment further includes a two-dimensional code generating unit and a two-dimensional code attaching unit, in addition to the constituents of the soup stock pack production apparatus in the embodiment 1 or the embodiment 2.

The two-dimensional code generating unit has a function to generate a two-dimensional code including information about the selected foodstuffs and the acquired composition ratios. By the function of the unit, the information including the selected foodstuffs and the acquired composition ratios is converted into the two-dimensional code. It is allowable to adopt a configuration in which the generated two-dimensional code is directly decoded by a smartphone or a tablet terminal and thereby the information about the selected foodstuffs and the like is acquired, or to adopt a configuration in which a server device or the like that holds the information about the selected foodstuffs and the like is accessed by reading the two-dimensional code and the information is acquired or seen.

Further, it is allowable to adopt a configuration in which information about the quantity of the soup stock pack, the place and date when the selection is performed, the date when the soup stock pack is produced, and the like is included in the generated two-dimensional code. Furthermore, it is allowable to adopt a configuration in which the selector identification information identifying the person having selected the foodstuffs or the selector identification information associated with the attribute information is included in the two-dimensional code. As the two-dimensional code, a matrix-type QR code (R), a stack-type PDF417 and the like can be used.

Figure 6:
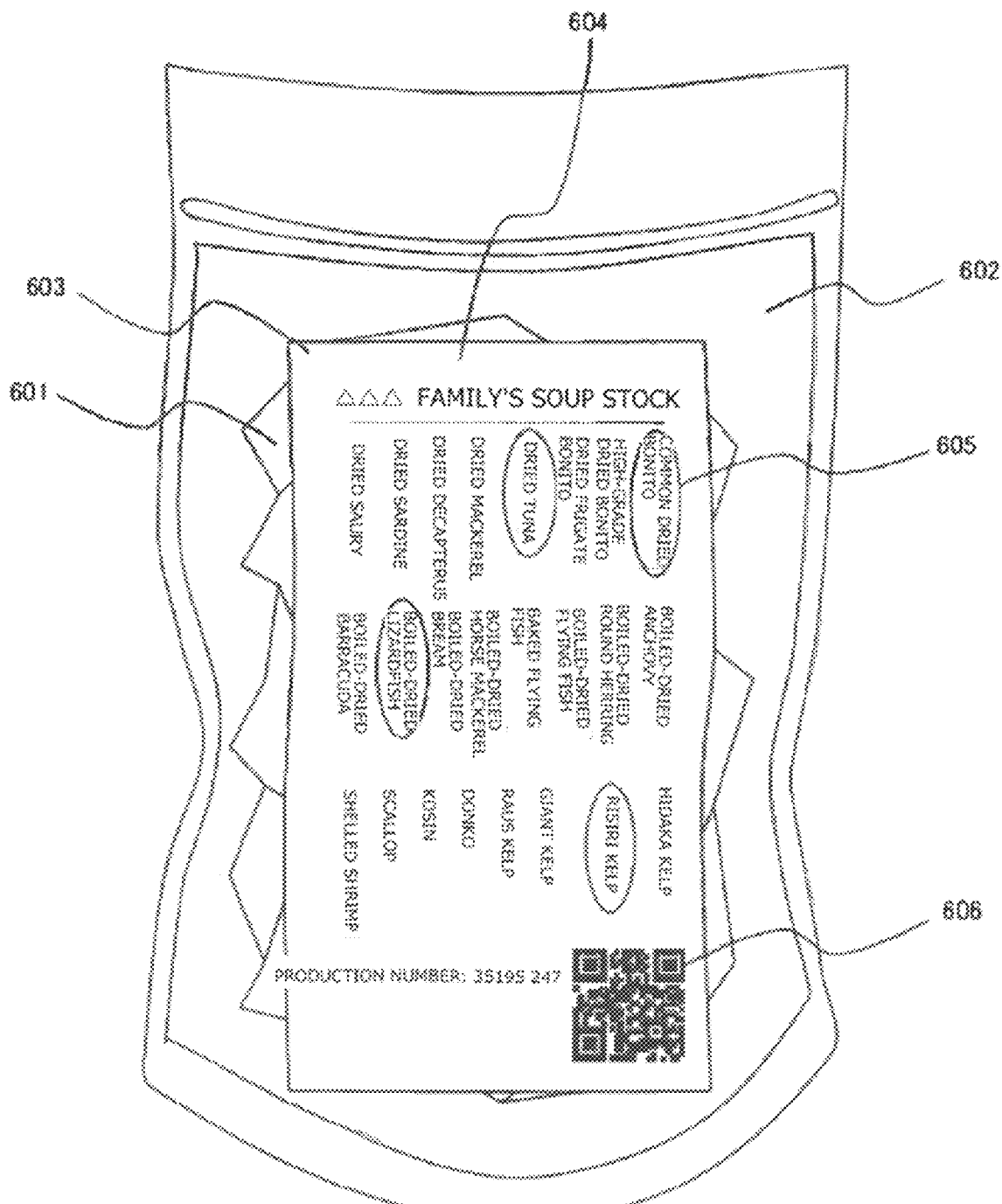
FIG. 6 is a conceptual diagram showing an example in which a two-dimensional code is attached to the bag that contains the soup stock pack.

The two-dimensional code attaching unit has a function to attach the two-dimensional code generated by the two-dimensional code generating unit, to the bag. FIG. 6 is a conceptual diagram showing an example in which the two-dimensional code is attached to the bag that contains the soup stock pack. As shown in FIG. 6, a label 603 is pasted on a bag 602 that contains a soup stock bag 601. On the label 603, "ΔΔΔ FAMILY'S SOUP STOCK" as the name of the person having selected the material of the soup stock pack is written, and each of common dried bonito, dried tuna, boiled-dried lizardfish and Risiri kelp is surrounded by a circle 605, as the selected materials of the soup stock pack. Furthermore, a two-dimensional code 606 is attached at a lower portion. Further, as shown in FIG. 5, the production number is displayed together.

FIG. 6 shows the front side of the soup stock pack product, and the two-dimensional code is attached to the label pasted on the front side. However, the selector and the selected materials may be shown on the front side, and the two-dimensional code may be separately attached on the back side. For example, it is allowable to adopt a configuration in which a label on which the name and contact address of the manufacturer or seller, the production number and the like are described is pasted on the back side of the bag and the two-dimensional code is together attached to the label on the back side. Even when the user cannot read the attached two-dimensional code, the user can contact the manufacturer or the like based on the described contact address and can acquire the information relevant to the soup stock pack based on the production number.

Further, the generated two-dimensional code may include information for accessing the selector soup stock pack information stored in the selector soup stock pack information storing unit. For example, by reading the two-dimensional code, the user can access information such as a purchase history of the soup stock pack whose materials have been selected by the user.

Figure 7:
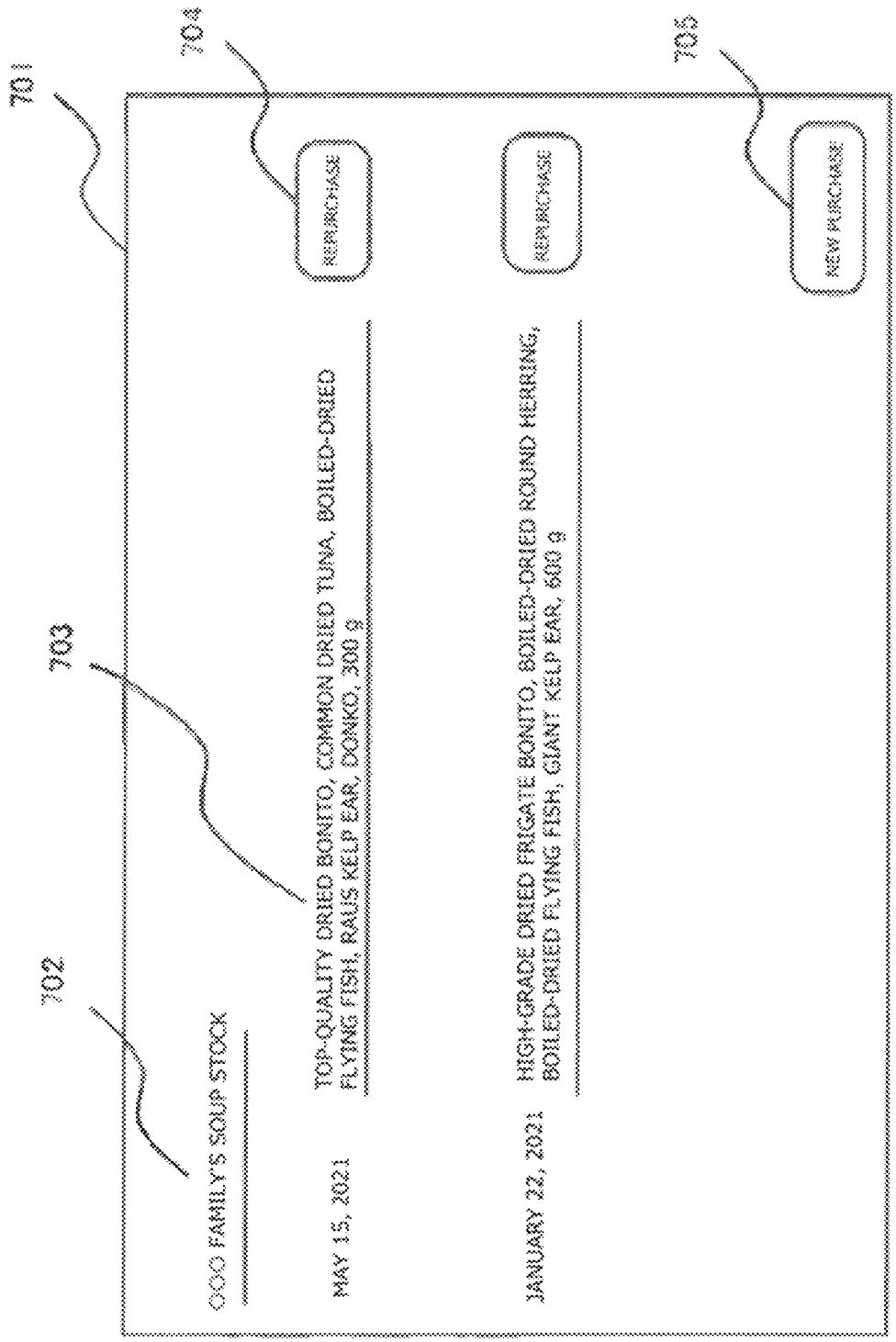
FIG. 7 is a conceptual diagram showing an example of the screen display of a purchase history of the soup stock pack.

FIG. 7 is a conceptual diagram showing an example of the screen display of the purchase history of the soup stock pack. The purchase history of the soup stock pack by the user is an accumulation of the selector soup stock pack information in which the selector is the user. As shown in FIG. 7, on a display screen 701 accessed by the reading of the two-dimensional code, "○○○" that is the name of the selector is shown (702), and the materials and quantity of a soup stock pack purchased on May 15, 2021 are displayed (703). Further, as a purchase history before that, the materials and quantity of a soup stock pack purchased on Jan. 22, 2021 are displayed. Further, together with each purchase history, a button 704 for repurchasing the soup stock pack having the same materials is displayed. By touching or clicking this button, the transition to a screen for repurchase procedure is performed. Further, a button 705 for newly purchasing the soup stock pack may be displayed. Further, the composition ratio and quantity of each of the materials of the soup stock pack may be displayed together.

The generated two-dimensional code may include information for accessing a member registration page. This member is a member of an EC site that sells the soup stock pack in the present invention. By reading the two-dimensional code, the member registration page is displayed on a smartphone or the like of the user, and input items necessary for the registration and the like are displayed. Necessary matters are input by the user, and thereby the member registration of the user is performed. The completion of the member registration may be a condition for accessing the purchase history of the soup stock pack. For example, when the two-dimensional code attached to the bag of the soup stock pack is read, the user is prompted to first perform the member registration, and the transition to the display screen for the purchase history as shown in FIG. 7 is performed with the condition that the member registration has been performed.

<Hardware Configuration>

The soup stock pack production apparatus in the embodiment can be realized by the hardware configuration shown in FIG. 3, similarly to the embodiment 1 or the embodiment 2. The functions of the two-dimensional code generating unit and two-dimensional code attaching unit of the soup stock pack production apparatus in the embodiment can be realized mainly by the CPU 301 and RAM 302 shown in FIG. 3 and a printer through the input-output interface 305.

<Processing Flow>

The processing flow of the soup stock pack production method in the embodiment is basically the same as the processing flow of the soup stock pack production method in the embodiment 1 or the embodiment 2. The soup stock pack production method in the embodiment further includes a two-dimensional code generating step of generating the two-dimensional code including the information about the selected foodstuffs and the acquired composition ratios, and a two-dimensional code attaching step of attaching the two-dimensional code generated in the two-dimensional code generating step, to the bag.

<Effect>

According to the embodiment, it is possible to produce the soup stock pack to which the two-dimensional code including the information about the foodstuffs selected as the material of the soup stock pack and the like is attached.

REFERENCE SIGNS LIST

100: booth
102: counter
103, 306: grinding machine
104, 307: packaging machine
200: soup stock pack production apparatus
201: selection accepting unit
202: composition ratio acquiring unit
203: grinding unit
204: packaging unit
300: soup stock pack production apparatus
301: CPU
302: RAM
303: storage
304: communication interface
305: input-output interface

What is claimed is:

1. A soup stock pack production method comprising:
   presenting, to a consumer, on a counter in a booth, a plurality of soup stock materials having an aroma;
   accepting, from the consumer, a selection comprising a predetermined number of the presented materials, the selection having been made by the consumer while having the opportunity to directly view the plurality of soup stock materials presented on the counter and smelling the aroma thereof;
   acquiring respective composition ratios of the selected materials;
   either (a) grinding together the selected materials, each appropriately blended and arranged in a respective quantity in accordance with the acquired composition ratios, or (b) first grinding the respective selected materials and then blending at the acquired composition ratios, to create a homogenized mixture comprising a plurality of ground soup stock materials;
   making a plurality of soup stock packs by dividing the homogenized mixture into a plurality of small groups, filling each small group into a respective water-permeable wrapping body allowing the soup stock to be easily extracted, and packaging and sealing each small group within the respective water-permeable wrapping body to form each respective soup stock pack; and
   presenting, to the consumer, the plurality of soup stock packs on the counter in the booth.

2. The soup stock pack production method according to claim 1, wherein at least the grinding and the packaging and sealing are performed in the booth, proximal to the counter wherein first the plurality of soup stock materials and then the soup stock pack were each respectively presented to the consumer.

3. The soup stock pack production method according to claim 1, further comprising:
   placing each respective soup stock pack in at least one bag, the bag displaying the selected soup stock materials; and
   presenting the at least one bag containing the soup stock packs to the consumer on the counter wherein the plurality of soup stock materials were presented to the consumer.

4. The soup stock pack production method according to claim 3, further comprising:
   acquiring a selector identification information identifying the consumer; and
   writing a name of the consumer on the at least one bag.

5. The soup stock pack production method according to claim 4, further comprising associating and storing the selector identification information and a selector soup stock pack information relevant to the soup stock pack.

6. The soup stock pack production method according to claim 5, further comprising:
   generating a two-dimensional code including information about the selected materials and the acquired composition ratios, the two-dimensional code configured and adapted to be directly decoded by a smartphone or a tablet terminal and thereby the information about the selected materials and the acquired composition ratios is able to be acquired directly by the smartphone or the tablet terminal, respectively; and
   attaching the two-dimensional code to the at least one bag.

7. The soup stock pack production method according to claim 6, wherein the two-dimensional code further includes information about the consumer.

8. The soup stock pack production method according to claim 6, wherein the two-dimensional code further includes information for accessing the stored selector soup stock pack information.

9. The soup stock pack production method according to claim 6, wherein the two-dimensional code further includes information for accessing a member registration page.

10. A soup stock pack production apparatus comprising:
a booth (100) comprising:
- a counter (101) provided with a plurality of open top containers (105) configured and adapted for containing and presenting, to a consumer, a plurality of soup stock materials having an aroma, such that the consumer is provided the opportunity to directly view the plurality of soup stock materials presented on the counter and smell the aroma thereof;
- a workbench (102);
- a grinding machine (103) configured and adapted to blend and grind some or all of the plurality of soup stock materials to create a homogenized mixture; and
- a packaging machine (104) configured and adapted to produce a plurality of soup stock packs by filling the homogenized mixture into a multiplicity of water-permeable wrapping bodies allowing the soup stock to be easily extracted, and packaging and sealing each respective water-permeable wrapping body to form each respective soup stock pack.

11. The soup stock pack production apparatus according to claim 10, wherein the grinding machine (103) is located proximate the packaging machine (104) within the booth (100).

12. The soup stock pack production apparatus according to claim 10, further comprising a first printer configured and adapted to display the plurality of soup stock materials on a bag configured and adapted to contain one or more soup stock packs packaged by the packaging machine (104).

13. The soup stock pack production apparatus according to claim 12, further comprising:
- an input device configured and adapted to acquire selector identification information identifying a consumer who has performed a selection of the plurality of soup stock materials; and
- a second printer configured and adapted to print a name of the consumer on the bag.

14. The soup stock pack production apparatus according to claim 13, further comprising:
- a CPU 301, RAM 302, and storage 303 or a server device or database connected through a communication interface 304, each respectively configured and adapted to associate and store the selector identification information acquired by the input device together with a selector soup stock pack information relevant to the one or more soup stock packs.

15. The soup stock pack production apparatus according to claim 14, further comprising:
- a third printer configured and adapted to generate a two-dimensional code including the selector soup stock pack information as a part of an encoded information;
- the two-dimensional code configured and adapted to be directly decoded by a smartphone or a tablet terminal, whereby the encoded information is able to be acquired directly by the smartphone or the tablet terminal, respectively; and
- the two-dimensional code configured and adapted for attachment to the bag.

16. The soup stock pack production apparatus according to claim 15, wherein the two-dimensional code includes information about the consumer as part of the encoded information.

17. The soup stock pack production apparatus according to claim 15, wherein the two-dimensional code includes information for accessing the stored selector soup stock pack information as part of the encoded information.

18. The soup stock pack production apparatus according to claim 15, wherein the two-dimensional code includes information for accessing a member registration page as part of the encoded information.

19. The soup stock pack production apparatus according to claim 15, wherein the grinding machine (103) is located proximate the packaging machine (104) within the booth (100); and wherein at least two of the first printer, the second printer, and the third printer are the same printer.

20. A soup stock pack production apparatus comprising:
a booth (100) comprising:
- a counter (101) provided with a plurality of open top containers (105) configured and adapted for containing and presenting, to a consumer, a plurality of soup stock materials having an aroma, such that the consumer is provided the opportunity to directly view the plurality of soup stock materials presented on the counter and smell the aroma thereof;
- a workbench (102);
- a grinding machine (103) configured and adapted to blend and grind some or all of the plurality of soup stock materials to create a homogenized mixture;
- a packaging machine (104) configured and adapted to produce a plurality of soup stock packs by filling the homogenized mixture into a multiplicity of water-permeable wrapping bodies allowing the soup stock to be easily extracted, and packaging and sealing each respective water-permeable wrapping body to form each respective soup stock pack;

a first printer configured and adapted to display the plurality of soup stock materials on a bag configured and adapted to contain one or more soup stock packs packaged by the packaging machine (104);

an input device configured and adapted to acquire selector identification information identifying a consumer who has performed a selection of the plurality of soup stock materials;

a second printer configured and adapted to print a name of the consumer on the bag;

a CPU 301, RAM 302, and storage 303 or a server device or database connected through a communication interface 304, each respectively configured and adapted to associate and store the selector identification information acquired by the input device together with a selector soup stock pack information relevant to the one or more soup stock packs;

a third printer configured and adapted to generate a two-dimensional code comprising encoded information, the two-dimensional code configured and adapted to be directly decoded by a smartphone or a tablet terminal, whereby the encoded information is able to be acquired directly by the smartphone or the tablet terminal, respectively, the two-dimensional code including:
a) the selector soup stock pack information,
b) information about the consumer,
c) information for accessing the stored selector soup stock pack information, and
d) information for accessing a member registration page;
the two-dimensional code configured and adapted for attachment to the bag;
wherein the grinding machine (103) is located proximate the packaging machine (104) within the booth (100); and wherein at least two of the first printer, the second printer, and the third printer are the same printer.

\* \* \* \* \*